United States Patent [19]
LeBlanc

[11] 3,877,144
[45] Apr. 15, 1975

[54] FISHING ACCESSORY

[76] Inventor: Michael P. LeBlanc, 9301 Burning Tree Rd., Bethesda, Md. 20034

[22] Filed: Feb. 20, 1974

[21] Appl. No.: 444,145

[52] U.S. Cl. .................. 30/124; 43/54.5 R; 269/16
[51] Int. Cl. ........................ B25f 1/00; B26b 11/00
[58] Field of Search .......... 43/4, 54.5 R, 1; 269/16; 312/232; 30/124

[56] References Cited
UNITED STATES PATENTS

| | | | |
|---|---|---|---|
| 249,892 | 11/1881 | Brown | 312/232 |
| 861,865 | 7/1907 | Laube | 269/16 |
| 1,771,294 | 7/1930 | Hackett | 269/16 |
| D219,974 | 2/1971 | Salzmann | 43/4 UX |

Primary Examiner—Louis G. Mancene
Assistant Examiner—Daniel J. Leach
Attorney, Agent, or Firm—LeBlanc & Shur

[57] ABSTRACT

Disclosed is a fishing accessory which at one time serves as bait container and holder therefor, knife, bait cutting board, fish scaler, scaling board and fish measuring scale. The device comprises a board having a retainer for a bait container, an integral knife and sheath, a scale, and a scaler and bottle opener on the blade of the knife. The underside of the board serves as a scaling board when the unit is inverted.

1 Claim, 4 Drawing Figures

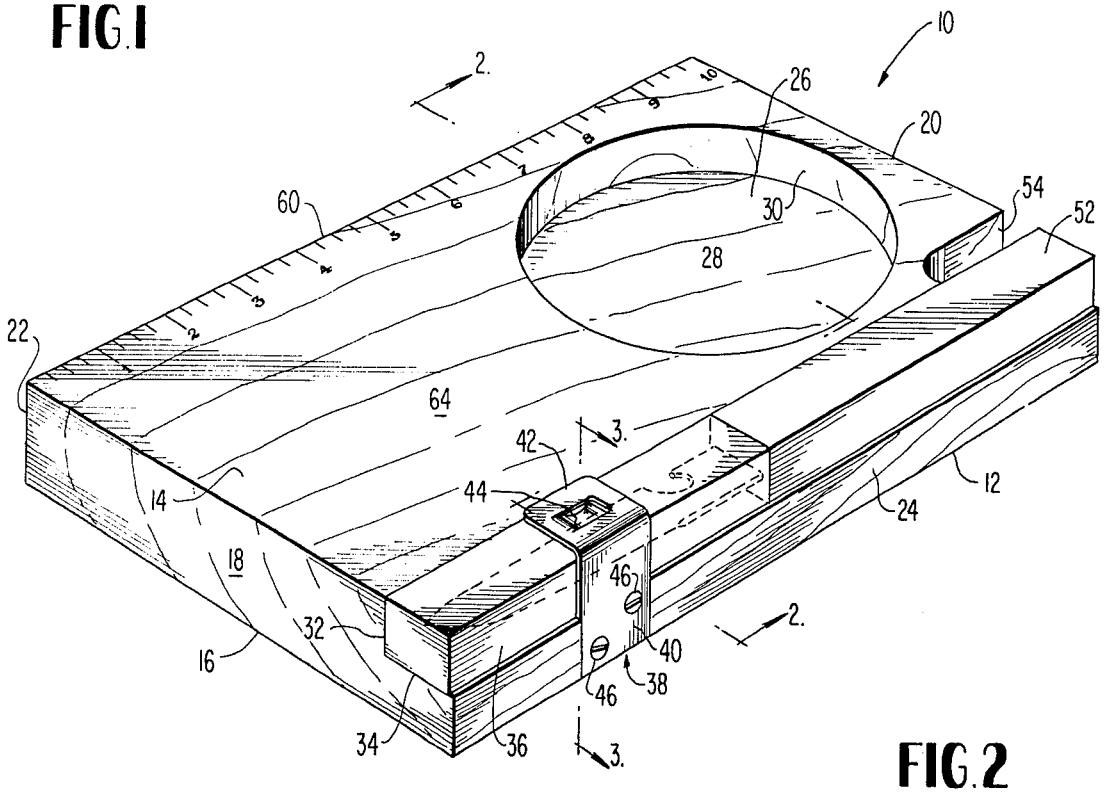
FIG.1
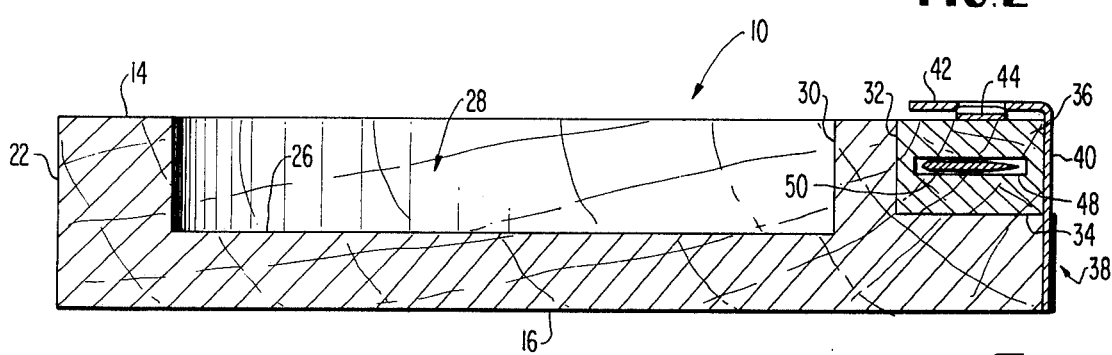
FIG.2
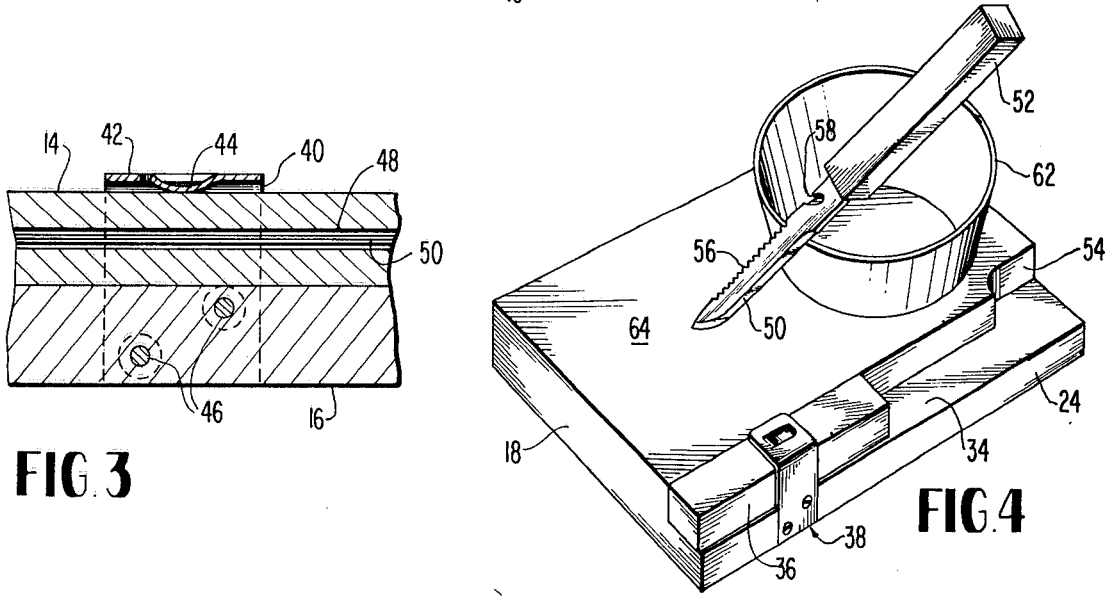
FIG.3
FIG.4

FISHING ACCESSORY

This invention relates to a fishing accessory, and more particularly relates to an accessory which serves as a bait container and holder therefor, knife, bait cutting board, fish scaler, scaling board and fish measuring scale.

Bait fisherman commonly purchase suitable bait, such as blood worms, clam snouts, nightcrawlers, or the like, in containers from which the fisherman removes the bait as needed for fishing. However, most such bait needs to be cut before use and the fisherman must preserve unused portions until the need for its use occurs. To this end, the fisherman normally has a knife for cutting the bait and generally utilizes a cutting board or block upon which to cut the bait, leaving unused portions of the bait upon such board or block until needed for use. The fisherman also usually carries a scale to determine the size of the fish, a scaler to scale the fish and a board on which to accomplish such scaling.

Under everyday circumstances of use, the knife, the block, the scaler and scale frequently become misplaced and the bait container is susceptible to blowing overboard if there is any substantial wind.

It is a purpose of this invention to eliminate or minimize the foregoing problems and to provide the fisherman with a unitary fishing accessory which will facilitate fishing and fish cleaning.

More particularly, it is an object of this invention to provide a fishing accessory which will at one time serve as a holder for the bait container, cutting board and knife.

It is still another object of the invention to provide a device of the foregoing type which also serves as a ruler for measuring the fish caught, as a board on which the fish may be scaled, as a scaler, and as a bottle opener.

These and further objects and advantages of the invention will be more apparent upon reference to the following specification, claim and appended drawings, wherein:

FIG. 1 is a perspective view of an accessory constructed according to the present invention;

FIG. 2 is a vertical section taken along line 2—2 of FIG. 1;

FIG. 3 is a partial vertical section taken along line 3—3 of FIG. 1; and

FIG. 4 is a further perspective view showing the device of this invention with a fish container in place and the knife removed, ready to cut bait.

Referring to FIG. 1, there is seen a fishing accessory generally indicated at 10, which comprises an elongated wooden board 12 having an upper surface 14, bottom surface 16, left end 18, right end 20, back side 22 and front side 24.

Formed in the right hand end of the top surface 14 is a depression or cut out portion 26 having a bottom 28 and generally vertical side wall 30. The depression in this particular embodiment of the invention is shown as being circular, although it will be understood that the depression may be square where local practice involves the sale of bait in square containers.

The juncture of the upper surface 14 and front side 24 are cut away to provide a rectangular slot having a vertical side 32 and a horizontal surface 34. Mounted in the slot formed by the side 32 and surface 34 is a rectangular knife sheath 36 which may be secured in position by a clip generally indicated at 38 having a vertical leg 40 and a horizontal leg 42. A spring finger 44 is struck downward from the horizontal leg 42 to resiliently hold the rectangular sheath 36. The clip 38 may be secured to the front edge 24 of the board 12 by any suitable means such as, for instance, wood screws 46. As shown in the drawings, the clip 38 is recessed into the front edge 24 of the board 12 so that such edge forms a smooth surface. Received within a suitable size slot 48 in the sheath 36 is the blade 50 of a knife having a square handle 52. The knife may be of the square wooden floating types readily available on the market.

At the right end of the vertical side 32 of the slot wherein the knife is mounted, there is provided a cutaway portion 54 of such a size as to permit entrance of the fingers to permit gripping of the handle 52 of the knife for removal of the same.

The blade 50 of the knife is preferably provided with a suitably serrated edge 56 which may be used for scaling fish. The same edge of the blade is also preferably provided with a cutaway portion 58 to form a finger suitable for use in opening bottles or other crown-seal type containers.

A scale 60 may be provided on the upper surface of the board 12 (or on the edge thereof), as desired, and this may be graduated in inches or other suitable units of measurement. While the indicated board is shown as being 10 inches long, it is obvious that it may be made longer depending upon the size of fish which it is expected will be caught.

In use, a bait container 62 (FIG. 4) is placed in the depression 28, bait is removed therefrom and cut on the left upper surface 64 of the board 12 by the blade 50 of the knife which has been removed from its sheath 36. The knife may then be returned to the sheath to prevent misplacement. Those cut portions of the bait which are then needed may be used and the remainder may remain upon the surface 64 until later needed. In this way, the board, the bait container and the knife are retained together without effort on the part of the fisherman.

During fishing, small bottom fish may be measured against the scale 60 to determine whether minimum size is reached and also to determine whether an "award" or "citation" fish has been caught. Upon completion of fishing, the fishing container 62 may be removed, the board inverted, and the scaler 56 used to scale the fish on the underside 16 (now the upper surface) of the board 12. Thus, in this one unitary accessory, the fisherman has a cutting board, retainer for the bait container, a cutting knife, a fish scaler, a fish scaling surface, a bottle opener and a scale, all of which may be stored for reuse with a much diminished possibility of misplacing any of the various aforesaid devices. Inasmuch as the accessory is made of wood, it will float and thus may be easily recovered if it inadvertently falls overboard. On the other hand, it is to be understood that the accessory may be constructed of other materials such as, for example, molded plastic.

This invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

1. A fishing accessory comprising a generally flat, elongated member having generally parallel upper and lower surfaces and side edges joining said surfaces, means on the said upper surface for receiving a bait container and restraining the said bait container against lateral motion, and a knife attached to said elongated member, said elongated member having a portion of said upper surface adjacent said means for receiving said bait container which serves as a bait cutting surface, said means for receiving a bait container comprising a depression in said upper surface, said knife including a sheath, knife blade and handle mounted along one of said side edges, said blade having a cutting edge and a serrated edge suitable for scaling fish, said flat elongated member, said sheath and said knife handle being wooden and said flat elongated member having a cutaway portion thereof adjacent one side of the handle of said knife to permit gripping of the said handle by the fingers of the user, said generally flat elongated member being longer in its elongated direction than in the horizontal direction normal thereto and the longitudinal axis of the knife blade extending substantially parallel to an edge of said elongated member substantially parallel to the long axis of said elongated member, said depression being disposed near one end of the upper surface of said elongated member, a bottle opener formed in one edge of said knife blade, a measuring scale on said upper surface of said elongated member, said sheath and said handle being received within a slot extending along said edge of said elongated member where said knife is mounted, with said sheath being secured to said elongated member by means of a metal clip having a vertical leg attached to said edge of said elongated member and a horizontal leg engaging the uppermost surface of said sheath.

* * * * *